(12) United States Patent
Coroban-Schramel

(10) Patent No.: US 11,177,760 B2
(45) Date of Patent: Nov. 16, 2021

(54) ELECTRIC MOTOR APPARATUS

(71) Applicant: ZF Automotive UK Limited, Solihull (GB)

(72) Inventor: Vasile Coroban-Schramel, Warwick (GB)

(73) Assignee: ZF Automotive UK Limited

( * ) Notice: Subject to any disclaimer, the term of this patent is extended or adjusted under 35 U.S.C. 154(b) by 0 days.

(21) Appl. No.: 16/852,805

(22) Filed: Apr. 20, 2020

(65) Prior Publication Data
US 2020/0343849 A1 Oct. 29, 2020

(30) Foreign Application Priority Data
Apr. 23, 2019 (GB) ...................................... 1905671

(51) Int. Cl.
*H02P 29/02* (2016.01)
*H02P 29/40* (2016.01)
*B62D 5/04* (2006.01)

(52) U.S. Cl.
CPC ............ *H02P 29/02* (2013.01); *B62D 5/0463* (2013.01); *H02P 29/40* (2016.02)

(58) Field of Classification Search
CPC ........ H02P 29/02; H02P 29/40; H02P 29/032; H02P 6/08; G05B 6/02; B62D 6/00; B62D 5/0463; B62D 5/005
See application file for complete search history.

(56) References Cited

U.S. PATENT DOCUMENTS

| 2008/0048591 A1* | 2/2008 | Hamada ................. B62D 5/065 318/9 |
| 2012/0191281 A1 | 7/2012 | Saito |
| 2015/0105952 A1 | 4/2015 | Lee et al. |

* cited by examiner

*Primary Examiner* — Karen Masih
(74) *Attorney, Agent, or Firm* — Robert James Harwood

(57) ABSTRACT

An apparatus for controlling an electric motor having a controller, a torque demand limit generator, and a drive stage. The controller may be arranged to receive as an input a torque demand signal indicative of the amount of torque demanded from the motor and to produce as an output a set of motor current demand signals. The drive stage may receive the motor current demand signals and is arranged to cause currents to flow in each phase of the motor as required to meet the demanded torque. The torque demand limit generator may be arranged to output a torque demand limit signal indicative of a torque demand limit above which the battery current would exceed one or more limits.

13 Claims, 20 Drawing Sheets

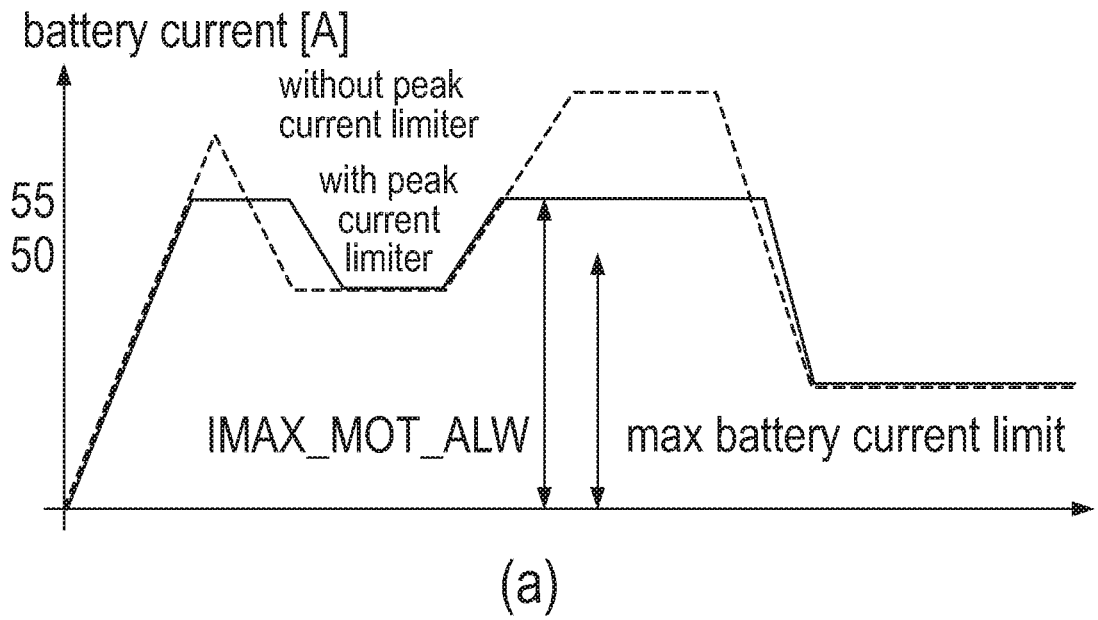
(a)
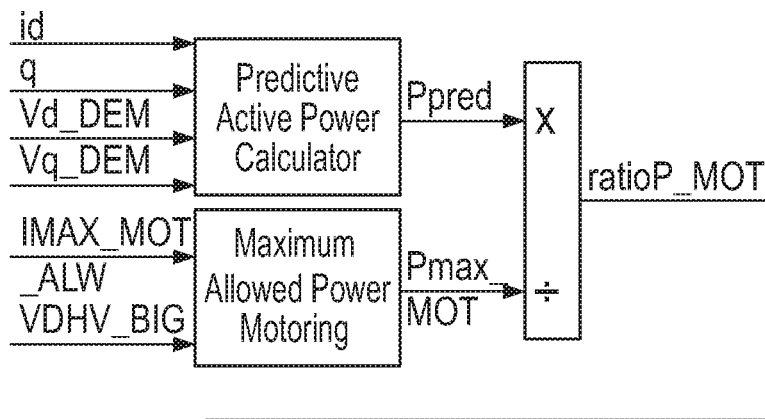
IF ratioP_MOT > 1 THEN
    vd_DEM=vd_DEM/ratioP_MOT;
    vq_DEM=vq_DEM/ratioP_MOT;
END
/* adjust the I-part of the controller */
vd_DEM_I=vd_DEM - KpId*Id_error
vq_DEM_I=vq_DEM - KpIq*Iq_error
(b)
Fig. 11

ELECTRIC MOTOR APPARATUS

CROSS-REFERENCE TO RELATED APPLICATION

This application claims priority to UK Patent Application No. 1905671.2, filed Apr. 23, 2019, the disclosure of which is incorporated herein by reference in its entirety.

TECHNICAL FIELD

This disclosure relates to an electric motor apparatus for controlling an electric motor.

BACKGROUND

Electric motors are used in a wide variety of applications and are becoming increasingly common in automotive vehicles. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

For accurate control of the motor torque it is essential to have control over the current applied to the motor. Typically a star connected three phase motor operated according to a pulse width modulation control/drive strategy is used, each phase being connected to upper and lower drive stage switches connected to the battery supply and an earth respectively. In a PWM strategy each phase is driven with a cyclic PWM drive signal having a first state and a second state and a duty ratio indicative of the ratio of the time spent in each state in a cycle. The torque required from the motor is determined as a torque demand signal which is then fed into a current controller which generates appropriate d-q axis motor current demand signals that will cause the motor to generate that torque. These are then converted as required by a drive circuit into three phase currents in the static frame of reference, which requires knowledge of the motor rotor electrical angle of position. A position sensor may be provided that measures the rotor position or the system may be of the sensorless type, such as that taught in WO 2004/023639. Finally, using measurements of the actual current as feedback the pulse width modulation (PWM) duty cycles for each phase that are needed to produce the required actual average currents are calculated and used to drive the motor phases.

The motor draws current from the electrical supply of the vehicle, typically a battery which is topped up by an alternator that is driven by the drive train of the vehicle either taking power from the engine or regenerative power during braking. The current drawn by the motor is a function of the battery voltage and the duty ratio of the drive signal applied to each phase.

At times where high assistance is required, the duty ratio of the switches will be high and the overall current drawn by the motor from the battery will in turn be high. For a healthy vehicle electrical system, the high current demand can generally be met by the alternator so the battery does not become depleted. The maximum current draw of the motor should be set to a level which can be met by the alternator to prevent the battery becoming depleted.

SUMMARY

According to a first aspect, the present disclosure provides an apparatus for controlling an electric motor, the motor and apparatus being supplied by a battery source, the circuit comprising: a controller arranged to receive as an input a torque demand signal indicative of the amount of torque demanded from the motor and to produce as an output a set of motor current demand signals; and a drive stage which receives the motor current demand signals and is arranged to cause currents to flow in each phase of the motor as required to meet the demanded torque; in which the apparatus further comprises a torque demand limit generator which is arranged to output a torque demand limit signal indicative of a torque demand limit above which the battery current would exceed one or more limits.

The electric circuit may include a torque demand generator which generates the torque demand signal indicative of the amount of torque demanded from the motor. The torque demand generator may generate a torque demand signal that has a value that is dependent on the amount of assistance torque demanded from the motor and the torque demand limit signal such that the value of the torque demand signal does not exceed the limit value. The torque demand limit signal may therefore be fed into the torque demand generator.

In an alternative, the torque demand generator may generate an ideal torque demand signal independent of the torque demand limit signal, and subsequently modify the torque demand signal if the signal would exceed the limit to produce the torque demand signal that is fed to the controller. The torque demand generator may set the value of the torque demand limit signal using a model of the motor and the drive stage via the torque demand limiter. This machine model may fully or partially characterise the motor and drive stage, and as such may include a number of parameters.

The model may include one or more of the following parameters as inputs: motor stator equivalent resistance; motor temperature; motor mechanical velocity; motor torque constant; motor maximum bridge power; motor bridge equivalent resistance.

In one preferred arrangement, the torque demand limiter may estimate, for a given battery current and for a given phase current limit and for a given motor speed, based on the parameters of the motor circuit model, the torque limit that limits the battery current to the given limit. By exceeding one or more limits we mean the current drawn from the battery and any associated alternator when the motor is motoring exceeds one or more maximum values, and may also mean that the current fed back to the battery when the motor is generating exceeds one or more limits, and preferably observes limits for both motoring and generating.

By applying limits to the torque demand fed to the current controller, the currents drawn by the phases of the motor can be very effectively limited since they are a function of the torque at the motor. This is a much simpler strategy compared with the prior art in which the individual currents within the controller are limited directly based on estimates or measurements of the currents. Limiting the torque demand allows any prior art current controller to be used without modification, since the controller is not aware that the torque demand fed to it has been so limited.

Typically the power supply will include a battery connected to an alternator which keeps the battery topped up and provides power to the electric motor when the engine of the vehicle is running. Therefore, in so far as the present disclosure refers to drawing current from a power supply it should be construed in general terms as the overall current being drawn from a battery, a battery and an alternator or just an alternator. The latter case would be applicable where the battery has been disconnected.

The torque demand limit may have a value equal to an estimated maximum amount of torque that may be generated by the motor without the current exceeding a limit. The value may only be an estimate as depending on the motor performance the current may exceed the limit at this torque value. The torque demand limit generator may set the torque demand limit as a function of the voltage of the battery via the torque demand limiter. At lower voltages the torque limit may be reduced compared with higher voltages.

The torque demand limiter may set the torque demand limit as a function of a predefined current maximum value that is predefined for the application. The torque demand limiter may set the torque demand limit as a function of the mechanical speed of the motor. The torque demand limiter may calculate or otherwise access values for one or more of the following parameters when determining the torque limit: the motor battery current limit; the generator battery current limits; the motor electric power limit; the generator electric power limit.

The torque demand limit signal may be comprised of multiple parameters. Where there are multiple parameters then all of the limits defined by the multiple parameters should not be exceeded by the torque demand signal. One parameter of the torque demand limit may be set as a maximum torque.

Another parameter of the torque demand limit may be defined in units of Newton-seconds, equating to an estimated current limit in units of Amp-seconds. For instance, if this is set to a value of 5 Amp-seconds the limit would be a current of 5 Amps for 1 second, or of 1 Amp for 5 seconds. The value may be set between 5 Amp-seconds and 80 Amp-seconds. The torque demand limit may therefore be set as an absolute value, and the torque demand generator may permit the torque to exceed the absolute value for a short period of time, perhaps up to 1 millisecond or so.

The torque demand limiter may set one or more parameters for use when the motor is motoring, i.e. drawing current from the battery, and one or more other limits for when the motor is generating, i.e. supplying current to the battery. In each case, the limit may be varied as a function of speed. The torque demand limiter may generate one or more battery current limits, and these limits may be fed into a model of the motor apparatus along with the battery voltage and used by the torque demand limiter to determine the torque demand limits.

The generation of the torque demand limits may therefore be a two-stage dynamic process, with the current limits first being calculated and the model then being used to generate the required torque demand limits. If the torque demand exceeds the limit, it is then limited accordingly.

The torque demand limiter may generate one or more of the limits as a function of the battery terminal voltage, for instance using a look up table. The torque demand limiter may be arranged to receive an override current limit value and where this is lower than the current limit values from the lookup table this may override the normal look up values. This may be a customer pre-set limit that must never be exceeded and hence static, or may be a dynamic limit supplied from another system fitted to the vehicle. For instance, if a critical system wants to ensure battery charge is preserved it may instruct the steering system to limit the current it can draw. The torque demand limiter may comprise a signal processing circuit. It may include a processor and memory in which determined values and parameters are stored.

The torque demand generator may additionally or alternatively limit the rate of change of demanded torque such that the rate of change of current drawn from the power supply during motoring or fed back into the power supply during generating is limited.

The setting of limits for the torque demand may not always prevent the battery current exceeding an allowed limit. This may be the case where the motor circuit model is inaccurate, for instance if the temperature has changed rapidly and the model is not taking account of temperature. It may occur where the model is pre-set for a batch of circuits and the motors and drive stages used in each circuit are slightly different.

Therefore the apparatus may include a current monitor which monitors the actual current demand values from the current controller, or the motor actual currents, or calculates estimates of the currents, and in the event they exceed the current limit the torque demand limiter may be instructed to further reduce the torque demand limits.

The monitoring of the actual or estimated currents or current demands may form part of a feedback control loop so that the torque demand limits are driven to the optimum values to limit the currents drawn from or fed into the battery. By monitoring the currents and feeding back to the torque limiter where the current limit is exceeded, any slight errors in the model can be accommodated. Because this is only correcting what should be small errors, the response time of the feedback loop can be relatively high.

In addition to limiting the overall current, the motor circuit may additionally limit the rate of change of the torque demand. This enables the rate of change of current to be limited, using the same model applied for determining the torque value limits. The torque demand generator may set a torque demand gradient limit which is fixed or dynamic and in the latter case will vary over time. It may be varied according to one or more operating parameters of the vehicle or the motor and drive stage. These parameters may include the motor speed, the vehicle speed, the state of charge of a battery of the vehicle electrical supply, the electrical supply voltage and others from a vehicle stability system or braking system.

The drive stage may convert the current demands into as pulse width modulated (PWM) waveform for each phase of the motor with cyclic pulse width modulated (PWM) drive signals having a first state and a second state and a duty ratio indicative of the ratio of the time spent in each state within a cycle, may comprise using the motor current demand signals together with a signal representative of the duty ratio of the PWM signal applied to each phase to determine the estimates of the current drawn from the electrical supply, and limiting the rate of change of current drawn from the electrical supply by the motor by modifying the motor torque demand signals. The current draw estimate can be expressed as:

$$i_{batt} = d_a i_a + d_b i_b + d_c i_c + I_{ECU}$$

where $I_{ECU}$ is an estimate of current drawn and is an optional offset to account for current drawn by the control circuit;

$d_a$, $d_b$, and $d_c$ are the duty ratios for the PWM signal for each of the phases a, b and c; and $i_a$, $i_b$, and $i_c$ are the instantaneous phase currents during the conductive part of the PWM cycle.

$$\begin{cases} I_{a\_demand} = I_{alpha\_demand} \\ I_{b\_demand} = \frac{1}{2}\left(\sqrt{3}\, I_{beta\_demand} - I_{alpha\_demand}\right) \\ I_{c\_demand} = -(I_{a\_demand} + I_{b\_demand}) \end{cases}$$

$$\begin{cases} I_{alpha\_demand} = I_{d\_demand} \cdot \cos(\theta_{predict}) - I_{q\_demand} \cdot \sin(\theta_{predict}) \\ I_{beta\_demand} = I_{d\_demand} \cdot \sin(\theta_{predict}) + I_{q\_demand} \cdot \cos(\theta_{predict}) \end{cases}$$

The current controller may comprise a PI (or PID) controller.

The apparatus may be used to control a motor of an electric power steering system. In such an application, the torque demand generator may receive as an input a measure of the torque in a steering part of the electric power steering system and may determine an initial torque demand value as a function of the measured torque. A map may be used that relates the measured torque to the torque demand, as is well-known to those familiar with the design of an electric power steering system.

The skilled person will understand that the one or more limits of the battery current may be predefined limits that are defined during the design of the system, or that are varied during use of the system. The current limit may be set in conjunction with a measurement or estimate of the battery voltage to effectively provide a limit on the power drawn from the battery, since the power is defined as the product of the battery current and battery voltage.

The present disclosure may also comprise in combination the electric circuit of the first aspect and an electric motor.

According to a second aspect, the present disclosure provides a method of controlling an electric motor circuit of the kind comprising an electric motor and a control circuit, the motor and control circuit being supplied by a battery source, the control circuit including a torque demand generator which generates a torque demand signal dependent on the amount of torque demanded from the motor, and a controller arranged to receive as an input the torque demand signal and to produce as an output a set of motor current demand signals, and a drive stage which receives the motor current demand signals and is arranged to cause currents to flow in each phase of the motor as required to meet the demanded torque, the method comprising generating a torque demand limit signal indicative of a torque demand limit above which the battery current would exceed one or more limits and generating a torque demand signal that has a value that is dependent on the amount of assistance torque demanded from the motor and the torque demand limit signal such that the value of the torque demand signal does not exceed the limit value.

The method may generate the torque demand limit signal using a model of the motor including one or more motor parameters. The method may further comprise measuring the current flowing in the motor and in the event that the current exceeds the current limit modifying the torque demand limit signal. The method may include any steps foreshadowed by features of the apparatus of the first aspect of the present disclosure. The method may be used with a motor in an electric power steering system or with a motor in a variety of other systems, both automotive and non-automotive systems.

BRIEF DESCRIPTION OF THE DRAWINGS

There will now be described by way of example only one embodiment of the present disclosure with reference to the accompanying drawings of which:

FIG. 11 is an overview of a circuit used to limit the peak of the battery current to a predefined allowable peak current for motoring where FIG. 11(a) explains the principle, and FIG. 11(b) shows the algorithm implementation:

$$P_{pred} = 1.5(v_{d\_DEm} i_d + v_{q\_DEm} i_q)$$

$$P_{max\_MOT} = v_{DRV\_STG} i_{MAX\_MOT\_ALW}$$

$$P_{max\_GEN} = v_{DRV\_STG} i_{MAX\_GEN\_ALW}$$

Figure 6:
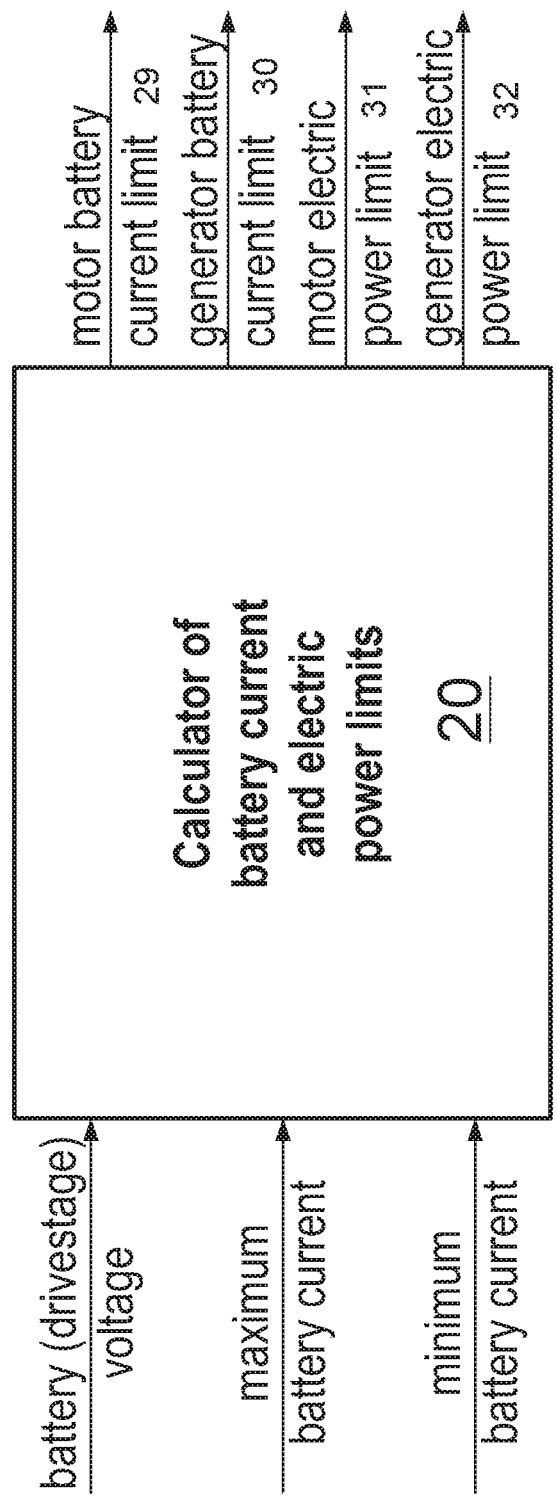
FIG. 6 shows the inputs and outputs of the torque demand limiter stage to initially calculate a target set of current and power limits.
Figure 7:
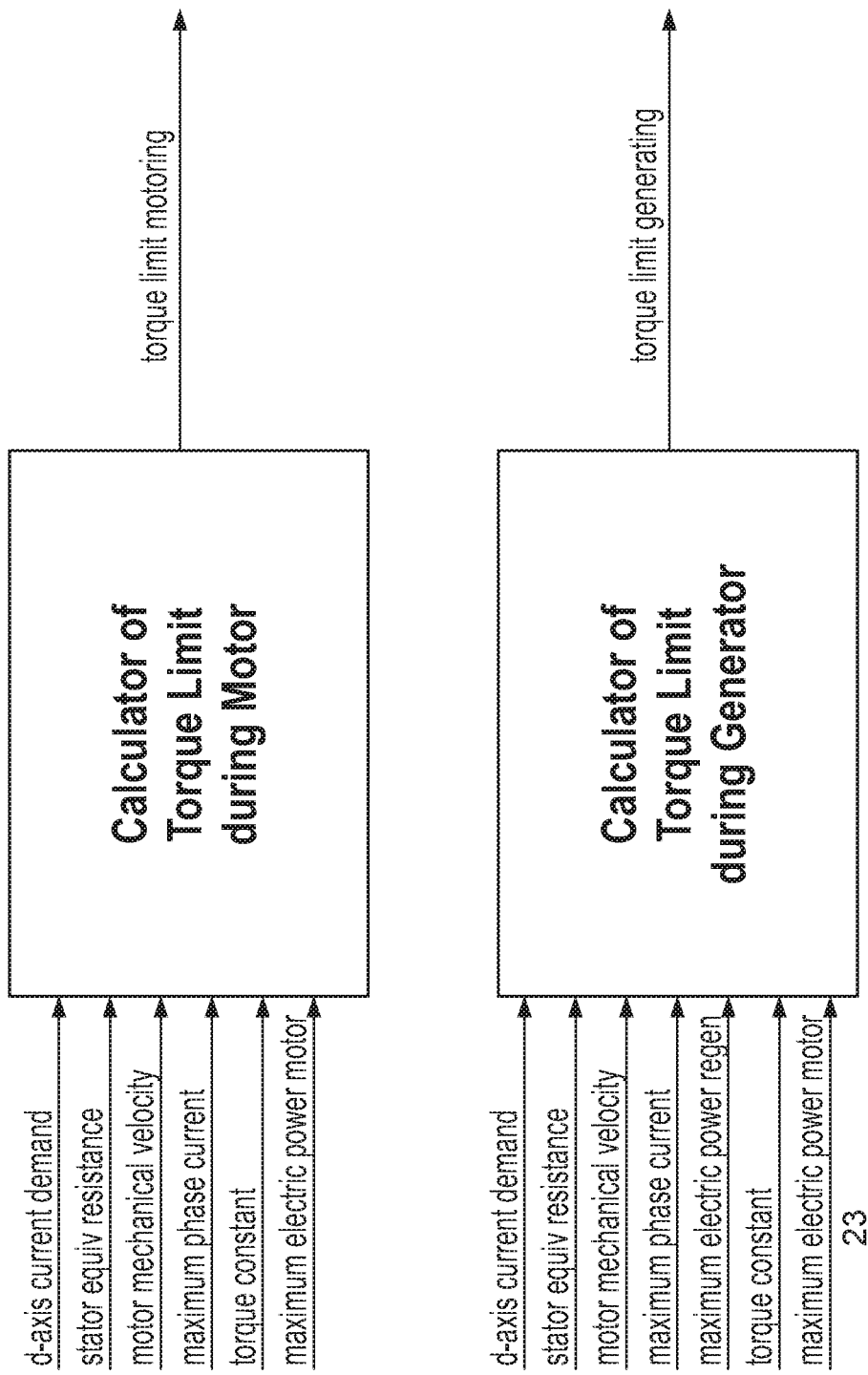
FIG. 7 shows the inputs and outputs of the torque demand limiter to set the torque demand limit using the current and power limits from FIG. 6 used when the motor is motoring.
Figure 8:
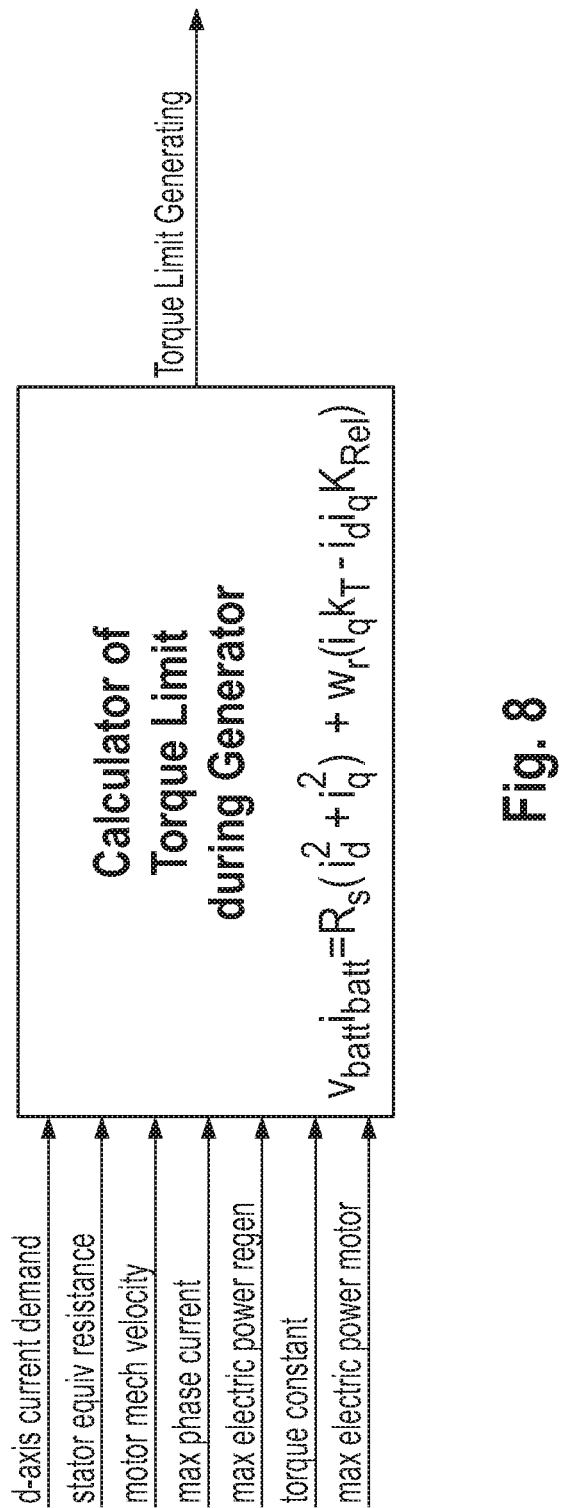
FIG. 8 shows the inputs and outputs of the torque demand limiter to set the torque demand limit using the current and power limits from FIG. 6 used when the motor is generating.
Figure 12:
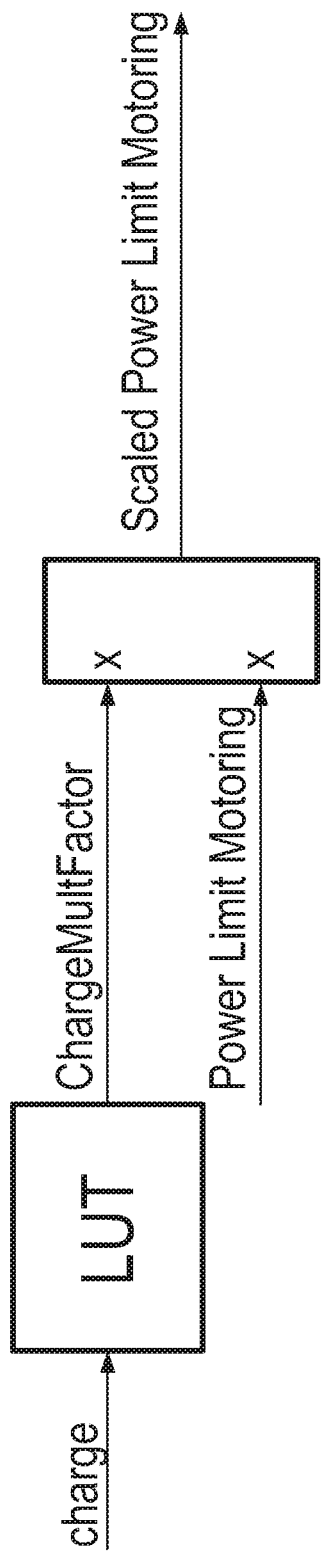
Figure 13:
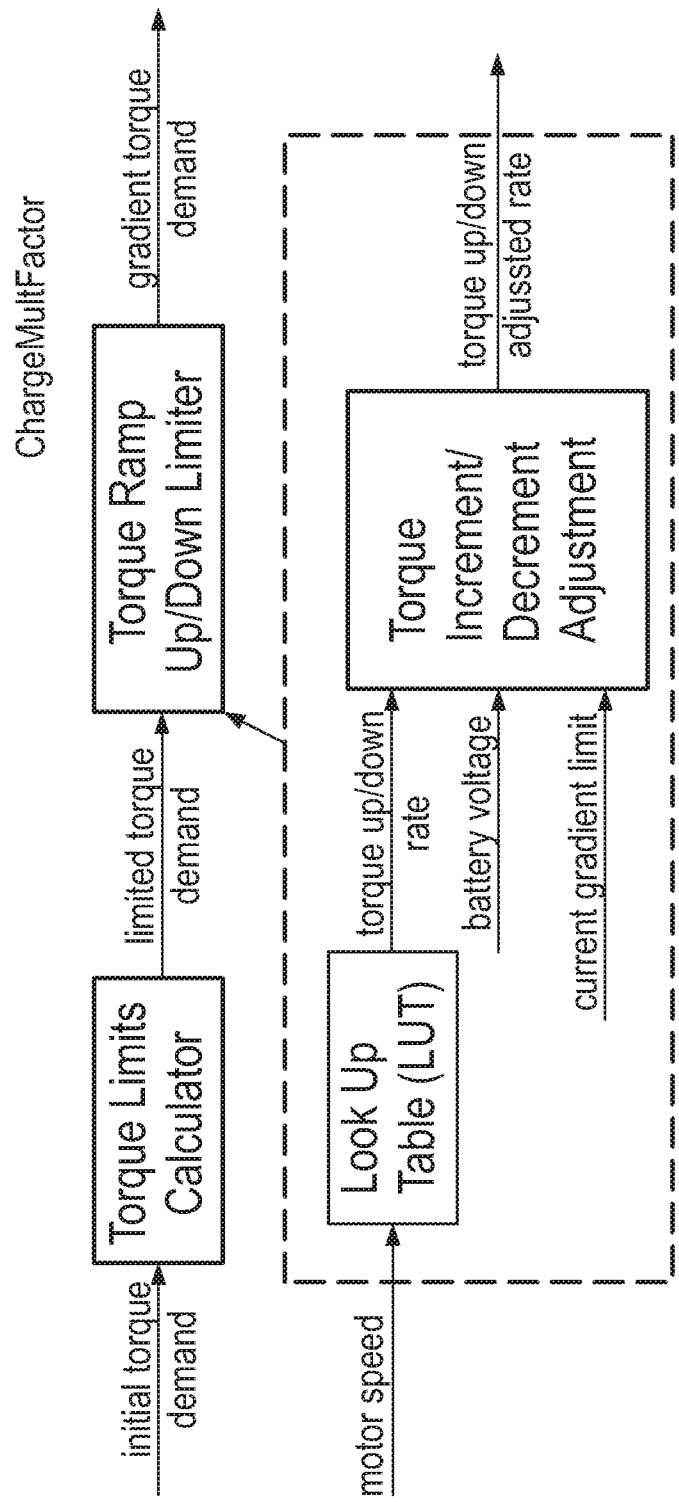
Figure 14:
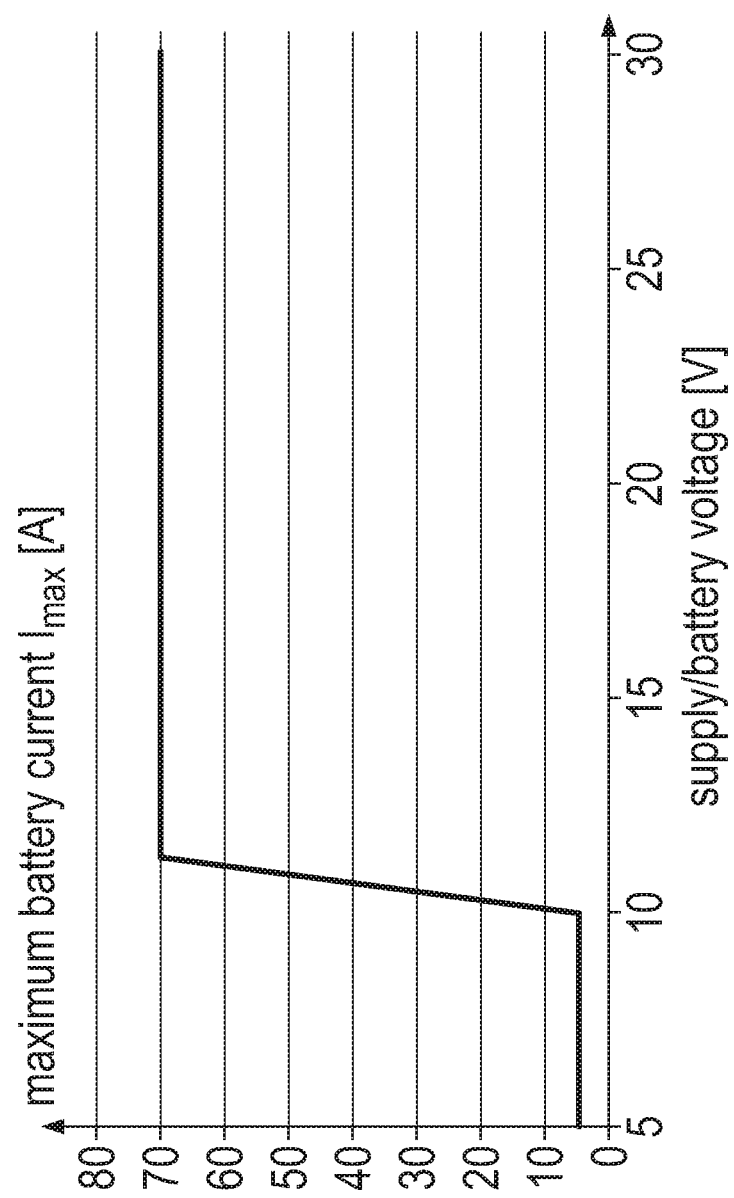
Figure 15:
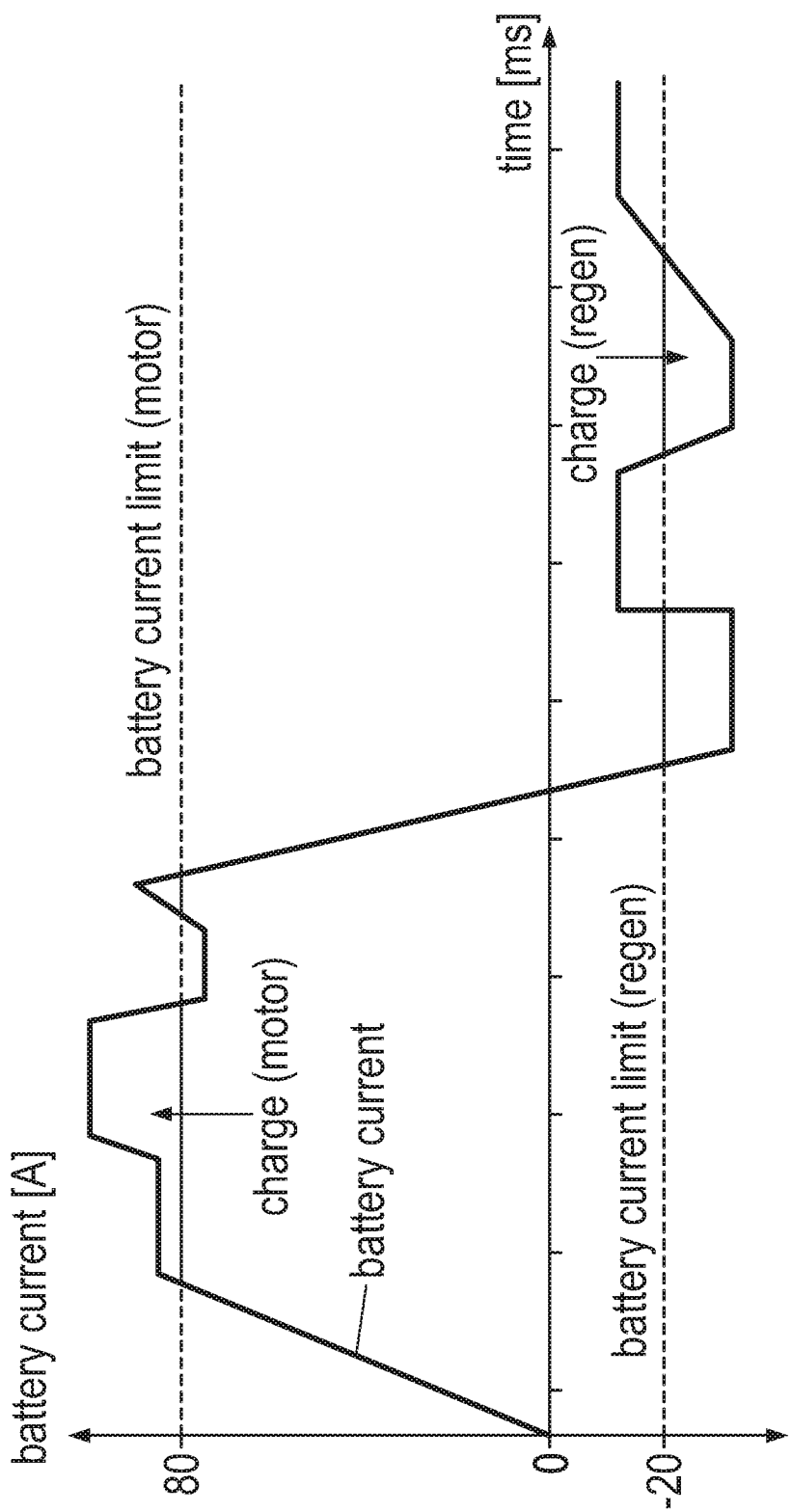
Figure 16:
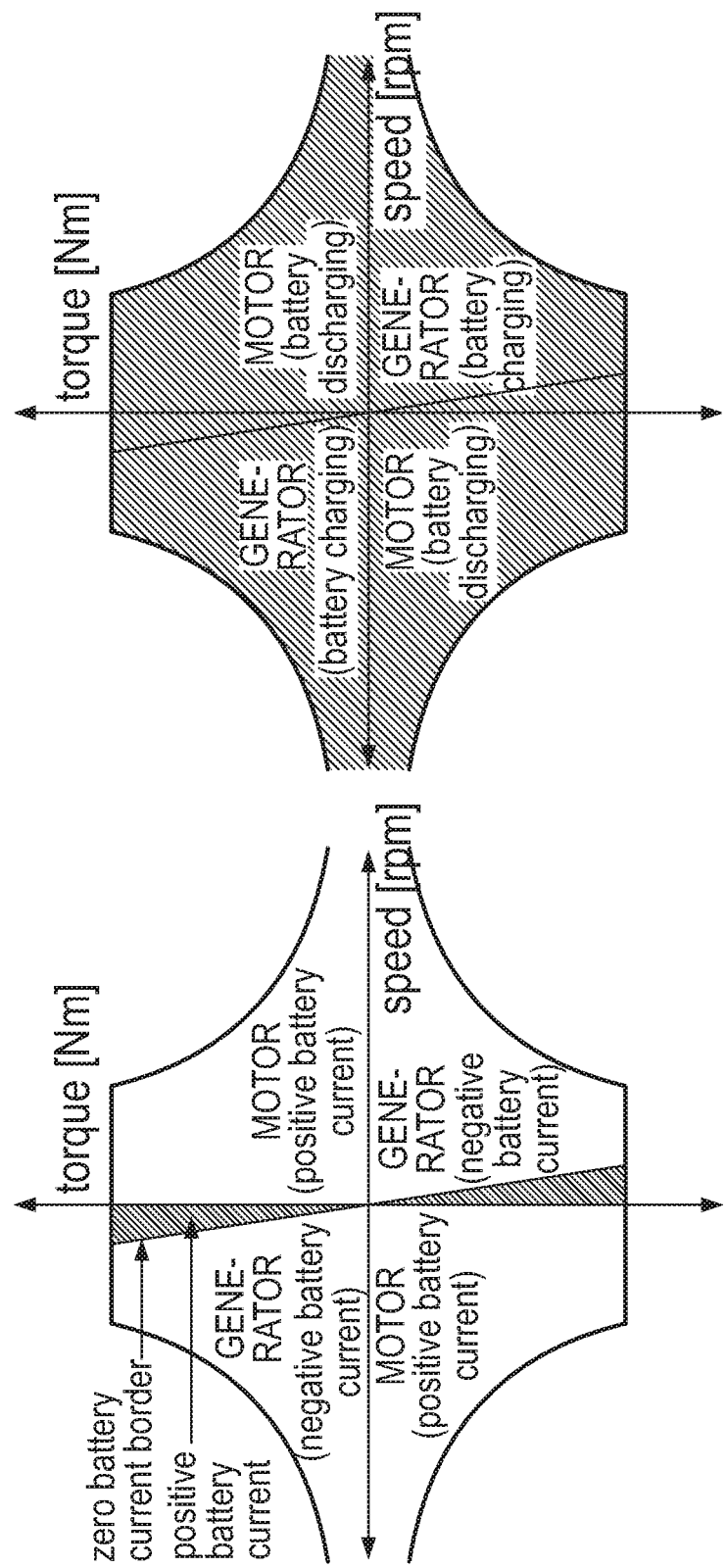
Figure 17:
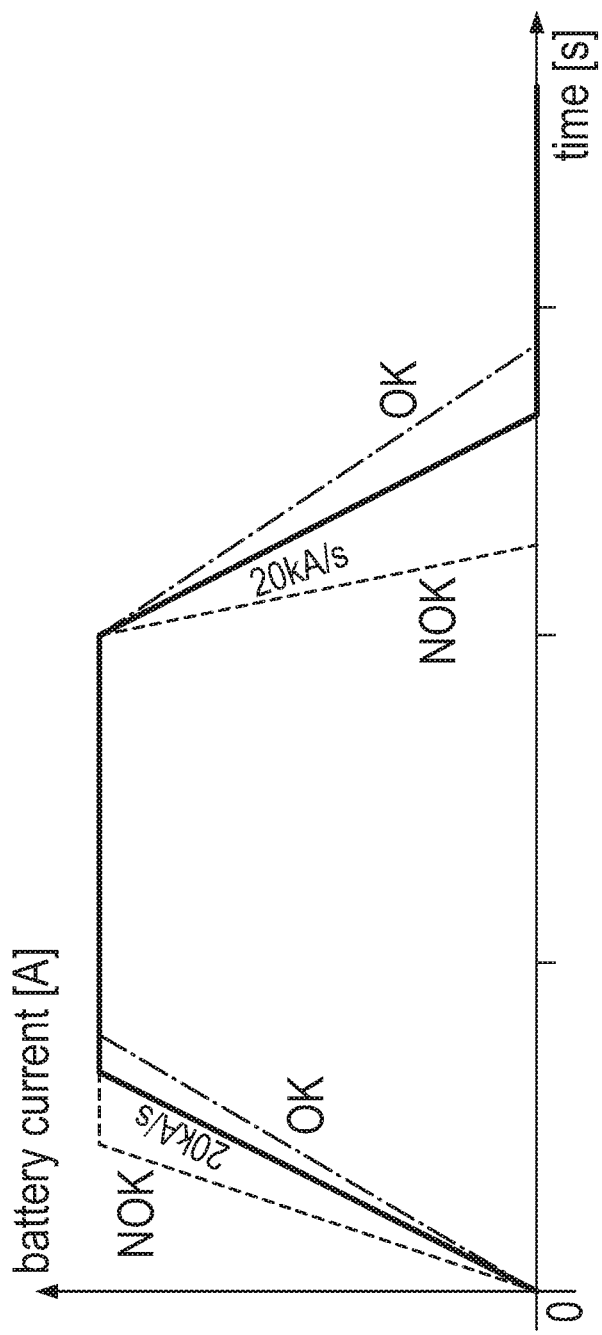
Figure 18:
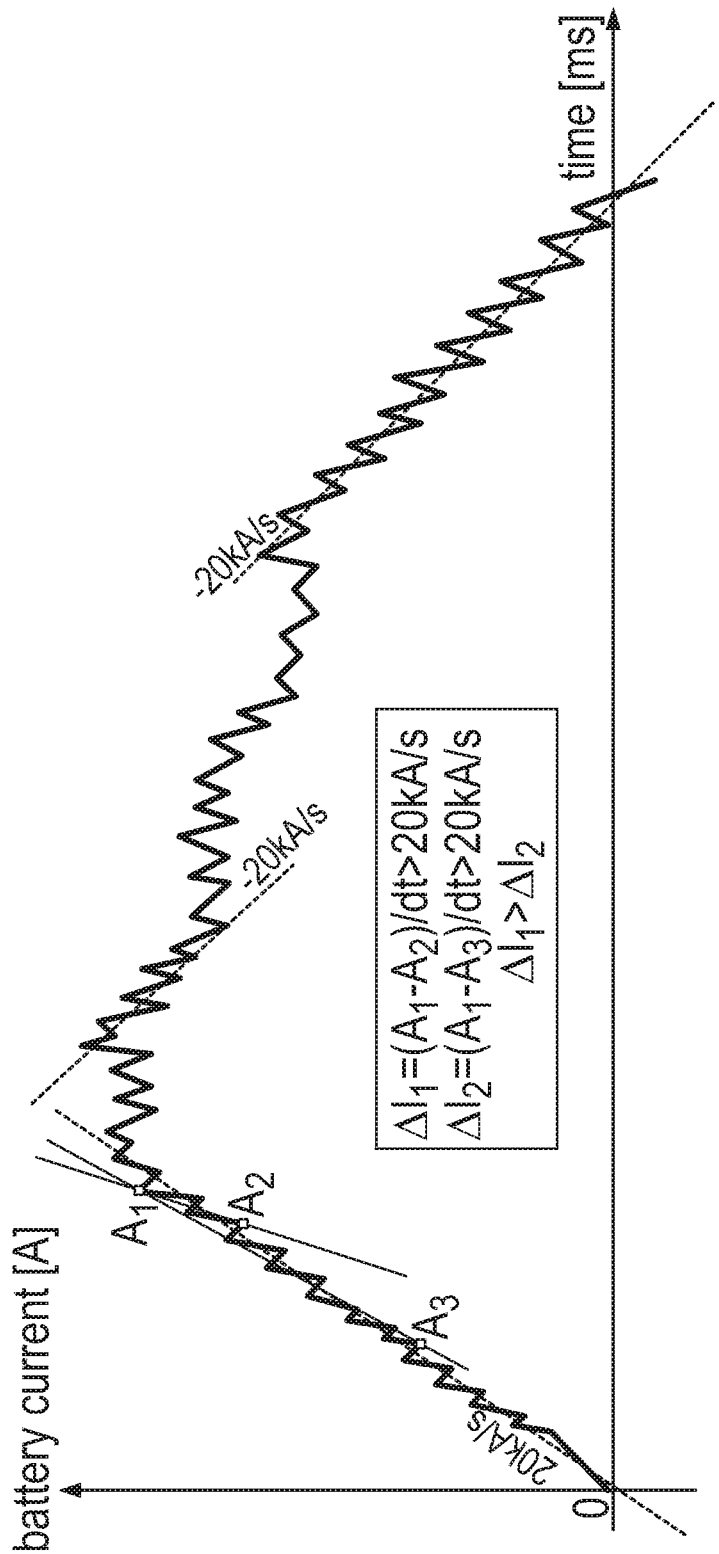
Figure 19:
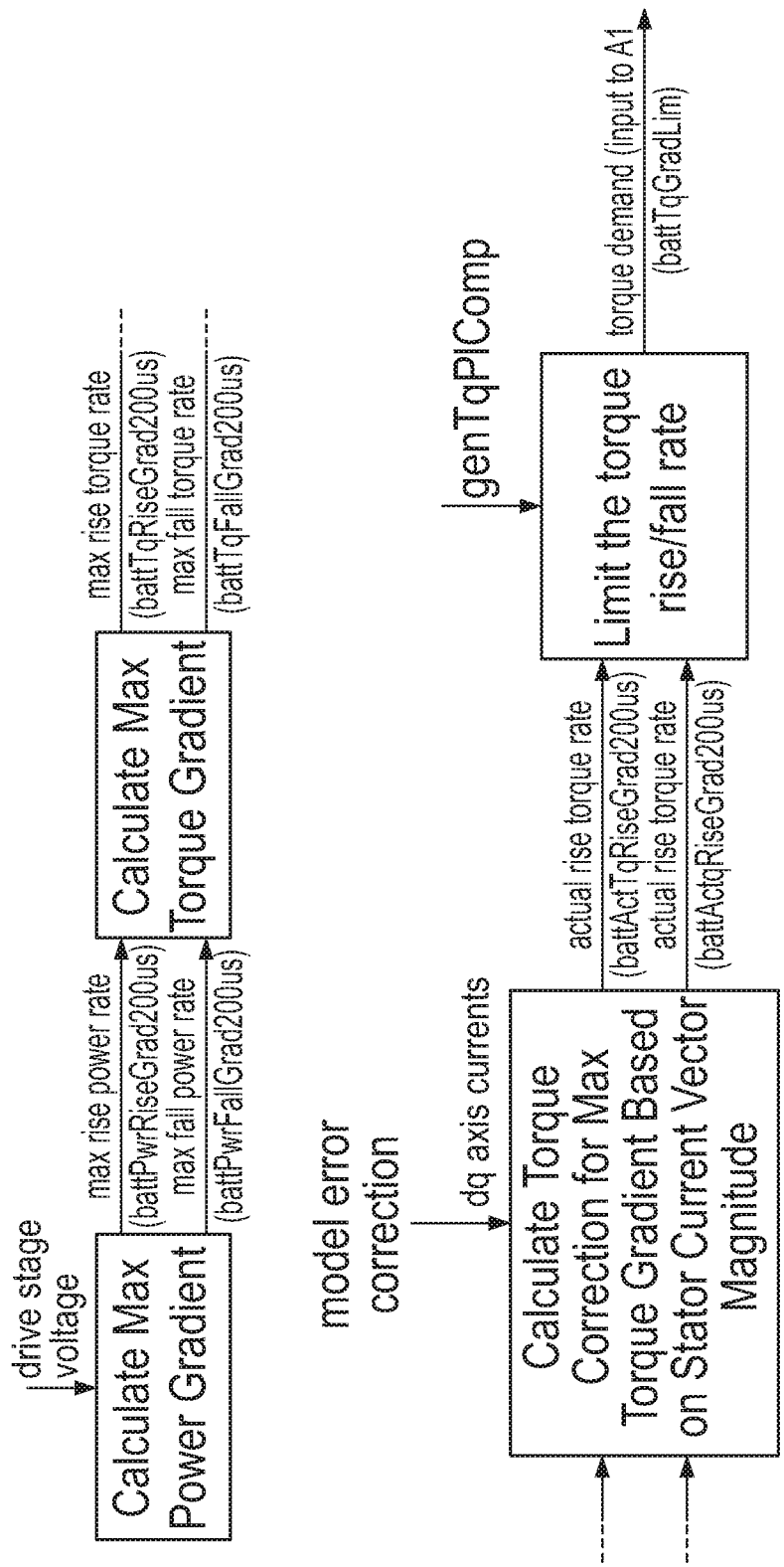
Figure 20:
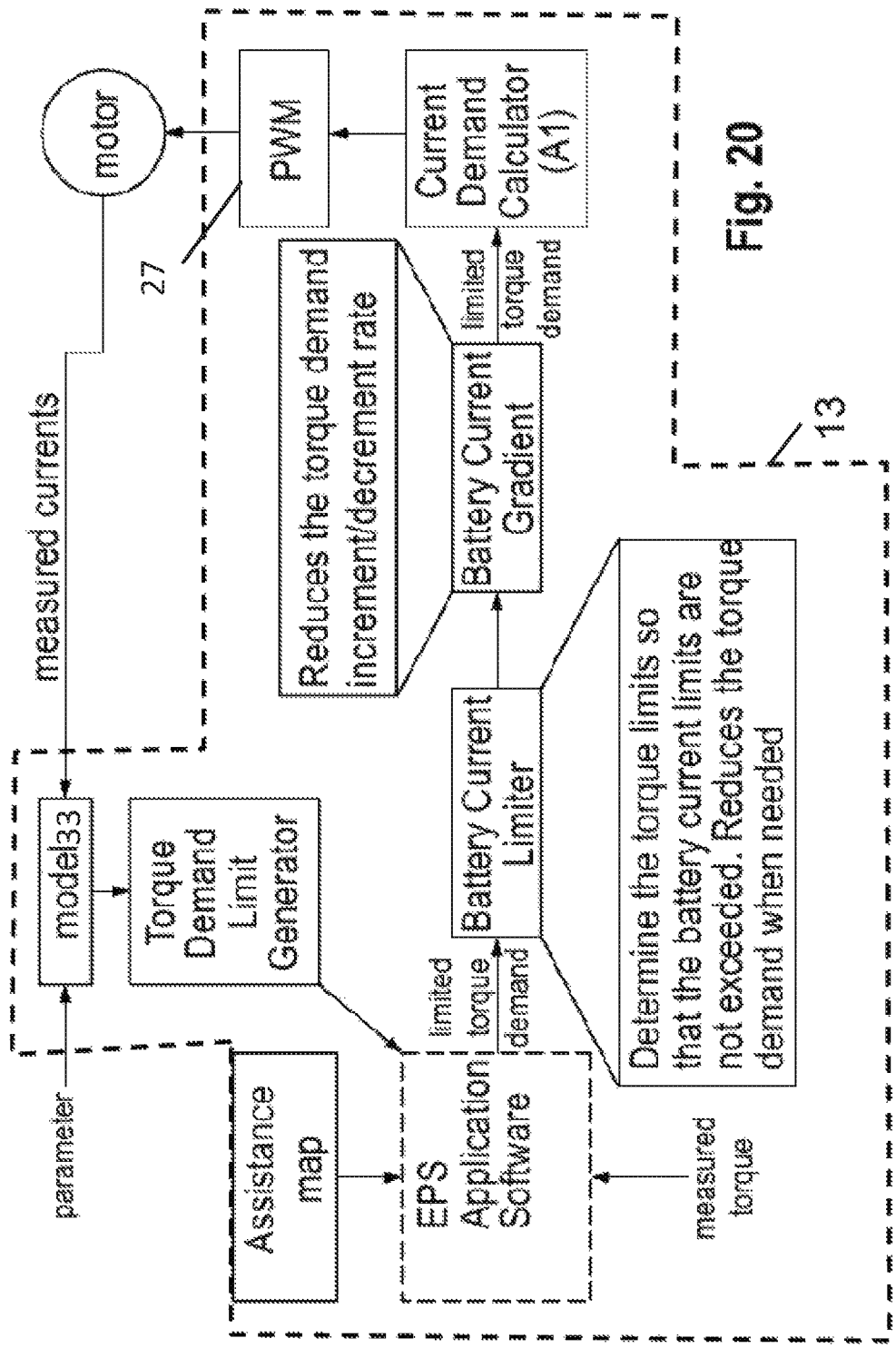

FIG. 12 illustrates an appropriate scaling of the torque demand limit as a function of excess charge accumulated in the battery over time due to the current limits being exceeded;

FIG. 13 is an overview of the function of the torque demand limiter when operating to limit the torque demand gradient;

FIG. 14 shows a typical map of battery voltage against battery current limit which can be used to populate an appropriate lookup table for use by the block of FIG. 6;

FIG. 15 is a sample plot of battery current over time showing the ideal current limit and overshoot due to inaccuracies in the model used in FIGS. 7 and 8 leading to charge accumulation;

FIG. 16 is a plot of torque demand limit covering all four quadrants of the motor operation;

FIG. 17 illustrates the current gradient showing both an unacceptable (NOK) high gradient and an acceptable (OK) lower gradient, and also an intermediate gradient which is OK due to the short duration;

FIG. 18 is a more refined plot corresponding to FIG. 17 showing how the traces are not smooth and lead to short spikes of increased gradient; and FIG. 19 is a block diagram showing the function of and optional charge limiting part of the motor control circuit; and FIG. 20 shows an alternative arrangement of an apparatus.

DETAILED DESCRIPTION

The following example describes an embodiment of the present disclosure used in an automotive application although the reader will understand that the present disclosure should not be limited in scope to such an application.

Figure 1:
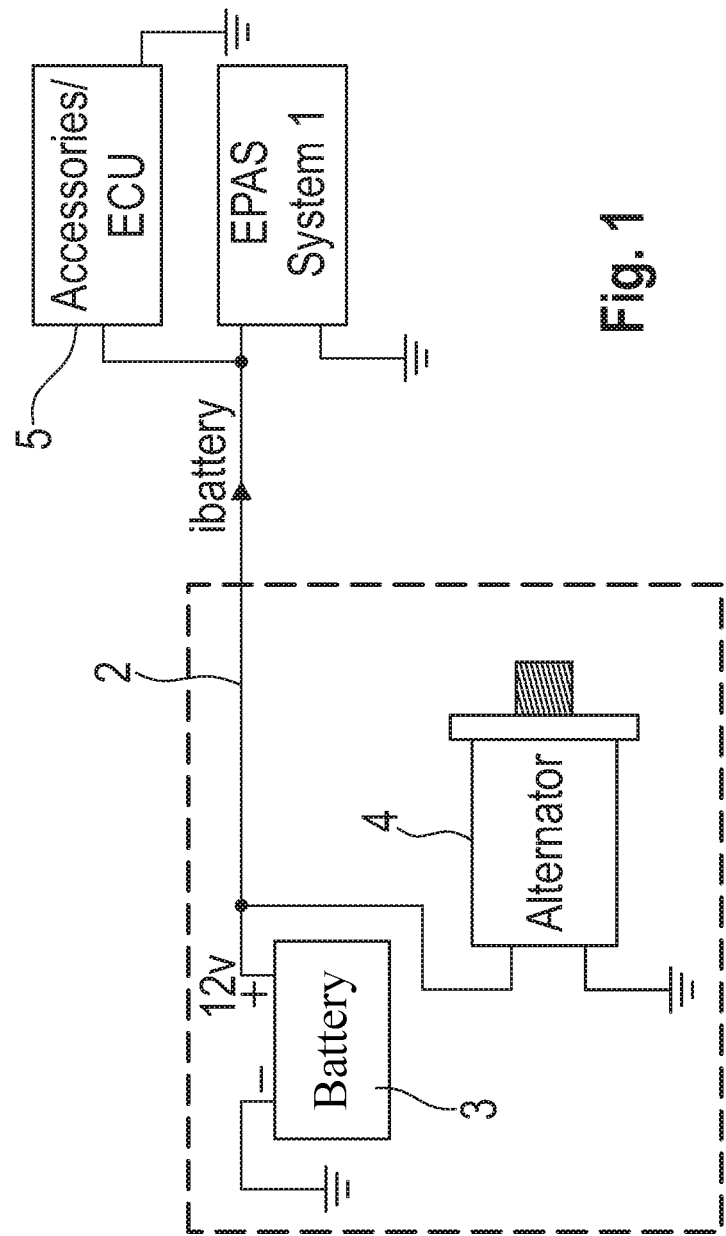
FIG. 1 is an overview of a part of a vehicle electrical system showing the connection of an electric power steering system the electrical supply.

As shown in FIG. 1 a vehicle is provided with an electric power assisted steering (EPAS) system that draws current $i_{battery}$ from the vehicle electrical supply across power rail 2. The supply comprises a battery 3, typically rated at 12 volts DC, which is in turn topped up by an alternator 4. The battery also provides current to other vehicle accessories 5.

Figure 2:
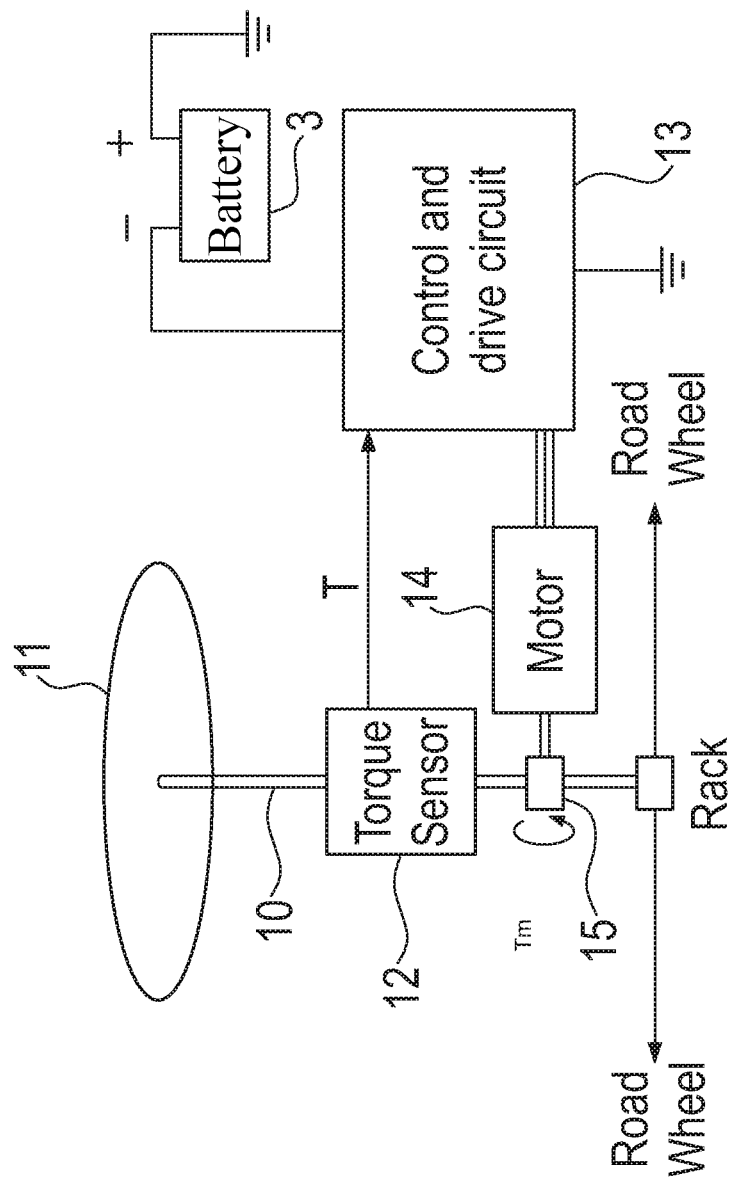
FIG. 2 is a schematic representation of the key parts of an exemplary electric power steering system to which the control strategy of the present disclosure can be applied.

The EPAS system 1 is shown schematically in FIG. 2 of the drawings. It includes a steering column 10 attached to a steering wheel 11, a torque sensor 12 which measures the torque applied to the steering column 10 by the driver as they turn the steering wheel, a motor control and drive circuit 13 and an electric motor 14. The torque sensor 12 may be attached to a quill shaft in series with the column 10, and the motor 14 may act upon the steering column or other part of the steering system, typically through a gearbox 15.

The motor 14 typically comprises a three phase wound stator element and a rotor having for example six embedded magnets within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets where the lines of magnetic flux from the rotor are in the radial direction, and the q axes are spaced between the d axes where the lines of magnetic flux from the rotor are in the tangential direction.

Figure 3:
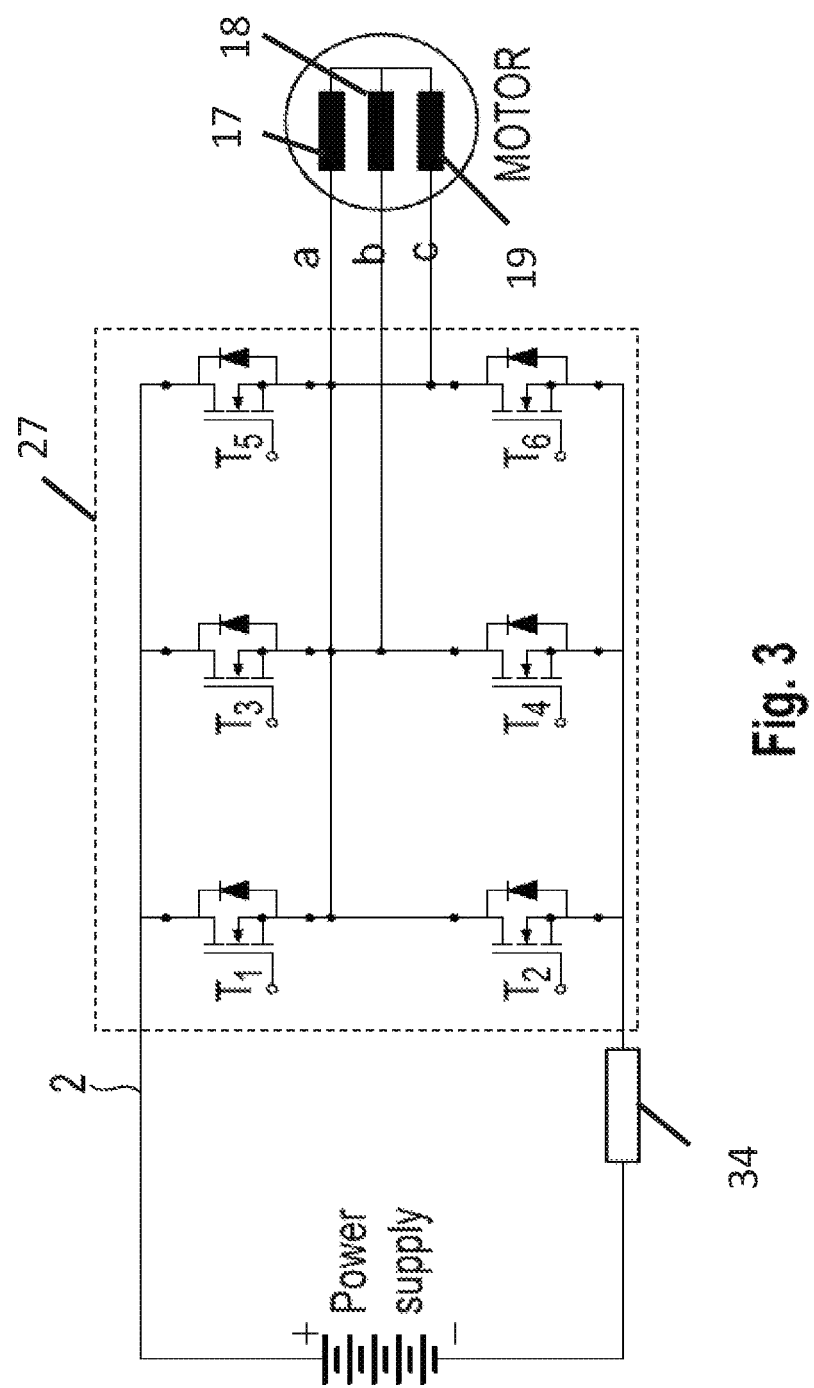
FIG. 3 shows a dual lane motor and motor bridge that may be used within the embodiment of an apparatus of the disclosure.
Figure 4A:
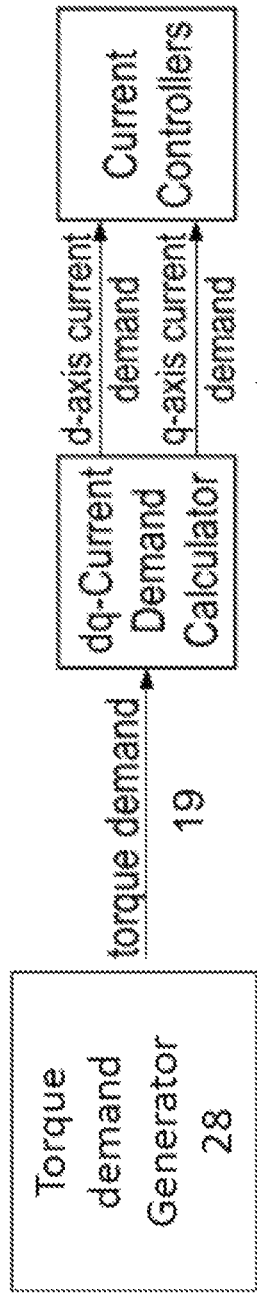
FIG. 4(a) shows a prior art electric motor apparatus.
Figure 4B:
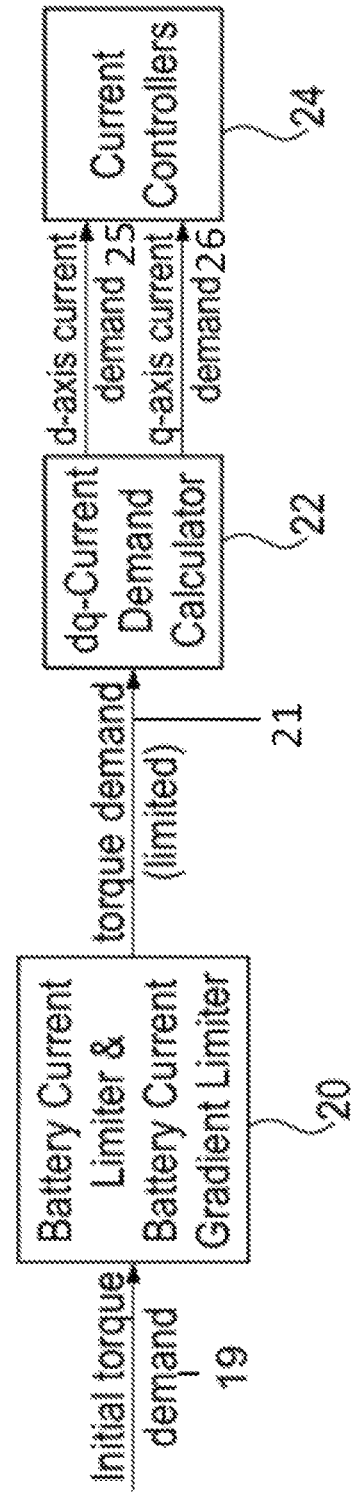
FIG. 4(b) shows an embodiment of the present disclosure at the highest system level, showing how torque demand is limited to in turn limit the current drawn from or fed back into the battery.

The three motor stator windings are connected in a star network. The motor is controlled by an apparatus 13 in accordance with an aspect of the present disclosure that includes a controller and drive stage. The drive stage 27 of the apparatus 13 comprises a three phase bridge forming a switching stage. This is shown in FIG. 3. Each arm of the bridge comprises a pair of switches in the form of a top transistor $T_1$, $T_3$, $T_5$ and a bottom transistor $T_2$, $T_4$, $T_6$ connected in series between the battery supply rail 2 and ground line. The motor windings are each tapped off from between a respective complementary pair of transistors. The transistors are turned on and off in a controlled manner by a control and drive circuit to provide pulse width modulation (PWM) of the potential applied to each of the terminals, thereby to control the potential difference applied across each of the windings and hence also the currents a, b, c flowing through the windings which depends on the duty cycled for each phase 17, 18, 19 of the motor. This in turn controls the strength and orientation of the magnetic field produced by the windings, and in turn the motor torque. In fact as shown in FIG. 3 the motor has dual lanes, so there is a duplicate of the three phases and the three phase bridge. The two lanes can be run in parallel, each providing one half of the motor torque, or used one at a time.

The torque signal output from the torque sensor 12 is fed to an input of the apparatus 13. This is input to a torque demand generator 28 which generates an initial torque demand signal 9. The initial torque demand represents an ideal torque demanded from the motor, for instance to provide an assistance torque to the driver as they turn the steering wheel.

The initial torque demand signal 19 is fed into a torque demand limit generator 20 which is arranged to limit the torque demand signal 19 in order to ensure that the current drawn by the apparatus does not exceed a limit, or in the case of a motor that is generating ensure that the current generated by the motor does not exceed a limit. If the initial torque demand signal value exceeds the limit it is held to the limit. If not, it passes through the torque demand limiter 20 without modification.

The modified torque demand limit signal 21 is fed into a current controller 24 which calculates a current demand for the motor. The current demand output form the controller 24 is in the form of two current demand signals 25, 26 in the d-q axis reference frame, one for each lane where two lanes a provided.

In a final stage, a drive circuit 27 converts the d-q axis currents output from the current controller 22 into three current demand components in a static reference frame, one for each phase of the motor 17, 18 or 19. These demand currents a, b, c are then converted by the drive stage 27, in combination with an estimate of the rotor position, into suitable PWM signals that are supplied to the switching motor phases of the drive stage 27 by PWM of the switches. A range of PWM switching strategies are known in the art and so will not be described in detail here. The switch arrangement is well known and described in such documents as EP 1083650A2. To provide control feedback a measurement of the phase currents is fed into the apparatus 13 from a current monitor 34, shown in FIG. 3 as a current shunt in the common ground path from the motor back to the battery.

The application of the torque demand limit causes the torque of the motor to deviate from the ideal torque demanded by the torque demand generator, but as will be apparent optimal setting of the limits ensures that at all times the motor is producing the maximum possible torque whilst ensuring that the current demanded from the battery and alternator do not exceed system limits. Importantly, the modification of the torque demand makes the implementation of the current controller simpler than prior art arrangements as all limiting is performed prior to the current controller. The controller, the torque demand generator and the torque demand limiter may be implemented using an electronic control unit running software that is stored in an area of memory.

Figure 5:
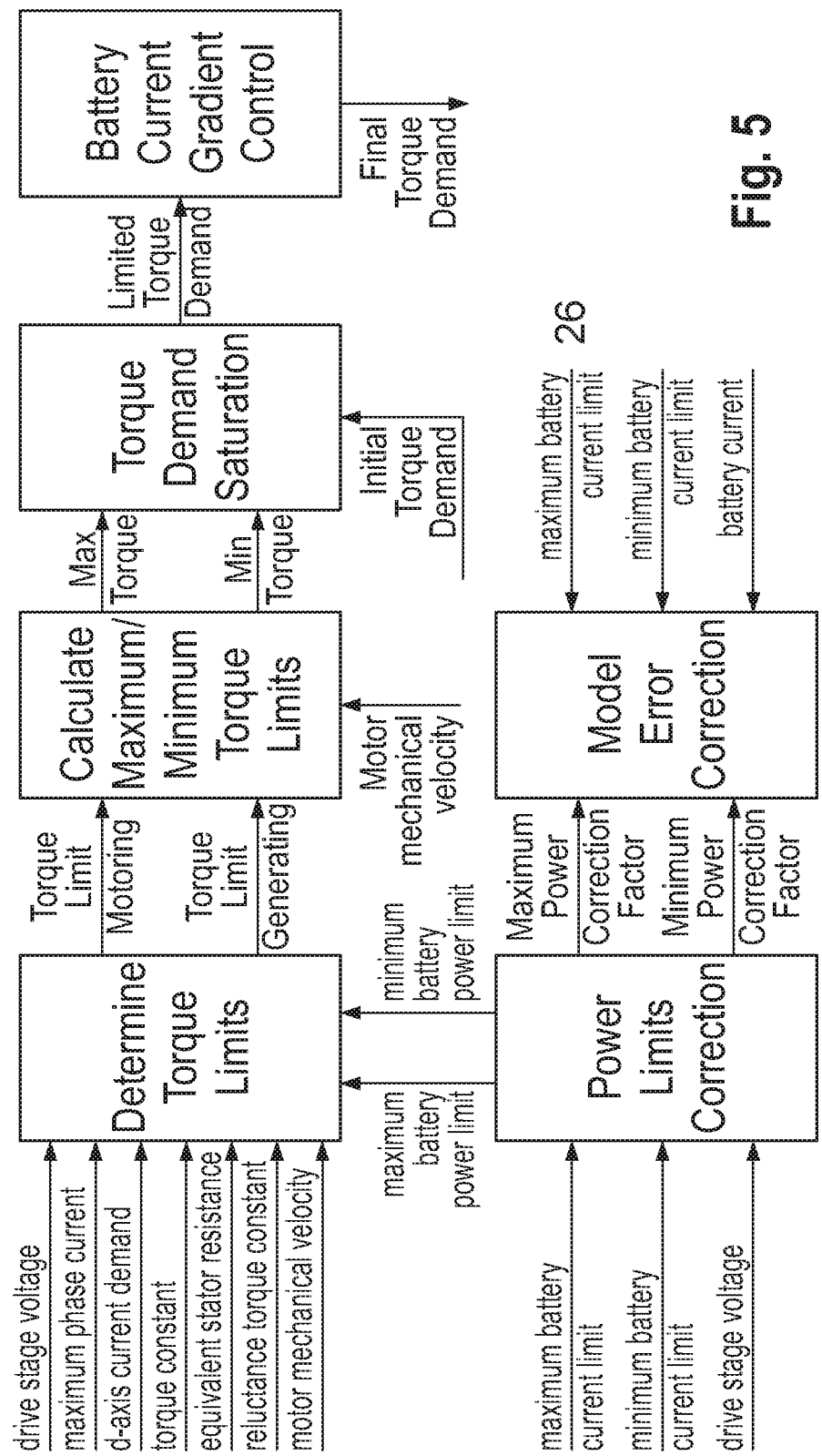
FIG. 5 is a more detailed representation of one particular exemplary implementation of the strategy illustrated in FIG. 4(b)

FIG. 5 is a block diagram showing at the highest level the function of each part of the apparatus, from the initial input of the measured torque to the output of the d-q axis current demand signals 25, 26. Note that as shown the torque limit is applied after an initial torque demand has been calculated. In a modification, shown in FIG. 20, the limit is used during generation of the initial torque demand.

The torque demand limiter comprises an algorithm which performs two distinct stages: Stage 1) Defines and applies a maximum torque limit for motoring and generating, and applies limit to initial torque demand; and Stage 2) Defines a maximum torque gradient for motoring and generating, and applies limit to initial torque demand. The two stages are embodied as software that is executed by a signal processor. An overview of the key function blocks of the software is shown in FIGS. 6 to 13 showing in more detail each of the key functional stages of the software and the input parameters and outputs.

Stage 1) Torque maximum limit: The purpose of this stage is to determine the torque limit that corresponds to the maximum battery current during generating, and separately to do the same for when the motor is motoring. In other words, if the motor produces the same torque as the torque limit the battery current limit for generating or motoring is not exceeded.

FIG. 14 shows a typical function of maximum torque plotted against the battery voltage. As can be seen, at low battery terminal voltages where it can be considered that the battery is partially depleted it is beneficial to greatly limit the current drawn by the motor. When the battery is fully charged, in this case above its nominal 12 volts, the current drawn can be held at a constant high limit. This is typically chosen as a function of the maximum rate at which the alternator can replenish the drawn charges, and ensures that over time the battery does not become depleted. Other factors may be relevant in the setting of this maximum limit.

FIG. 15 shows the effect of the limit on the torque demand over time. The current that is demanded from the motor, or generated by the motor, is capped at the limit. Since the current demand is a function of the torque demand, this means that the torque demand can be limited to achieve the required cap provided that the algorithm is aware of the required limit and the operational parameters of the motor.

Prior to limiting the torque, the torque demand limiter in a first block shown in FIG. 6 calculates a set of current limits. As shown there is a limit calculated for the motor battery when the motor is in a motoring operation and drawing current. A limit is set for the battery current when the motor is generating. Limits are also set for the motor drive stage bridge when motoring and the drive stage bridge when the motor is generating. The limits may include a motor battery current limit 29, a generator battery current limits 30, a motor electric power limit 31 and a generator electric power limit 32.

These limits may be set as shown as a function of the battery voltage-using a map or lookup table (LUT) similar to the one shown in FIG. 14, as a maximum overall current demand for motoring and generating which may be pre-set by a customer. From these current limits, the torque demand limiter next determines corresponding torque demand limit values. This is performed by feeding into the torque demand limiter motor parameters that can be used to model the behaviour of the motor. These include the instantaneous current demand, the resistance of the motor phases and bridge, the velocity of the motor and a torque constant. The aim is to feed the current limits into a model 33 to generate appropriate torque demand limits.

FIG. 7 shows the function defining the model that is used to calculate the torque limits when the motor is motoring. For an electric motor with negligible core and mechanical losses, the power equation can be written as:

$$v_{batt}i_{batt} = R_s(i_d^2 + i_q^2) + T_m\omega_m$$

For a given battery current limit the above equation becomes:

$$v_{batt}i_{max} = R_s(i_d^2 + i_{qmax}^2) + T_{max}\omega_m$$

Expanding the torque, the equation becomes:

$$v_{batt}i_{max} = R_s(i_{dDem}^2 + i_{qmax}^2) + (i_{qmax}k_T + i_{qmax}i_{dDem}k_{Rel})\omega_m$$

The equation to be solved for motoring is:

$$P_{max} = R_s(i_{dDem}^2 + i_{qmax}^2) + (i_{qmax}k_T + i_{qmax}i_{dDem}k_{Rel})\omega_m$$

The above equation can be re-arranged in a quadratic equation with one unknown:

$$R_s i_{qmax}^2 + i_{qmax}(k_T + i_{dDem}k_{Rel})\omega_m + R_s i_{dDem}^2 - P_{max} = 0$$

The solution of this equation is:

$$i_{qmax} = \frac{-b + \sqrt{b^2 - 4ac}}{2a}$$

where: $a = R_s$, $b = (k_T + i_{dDem}k_{Rel})\omega_m$ and $c = R_s i_{dDem}^2 - P_{max}$; and $k_{Rel} = -1.5p(L_d - L_q)$ These equations can be solved to give the torque T as:

$$T_{max} = (i_{qmax}k_T + i_{qmax}i_{dDem}k_{Rel})$$

where Vbatt=dc-link/drive stage voltage; Ibatt=battery/power supply current; Rs=equivalent stator resistance; Iq=q axis current; Id=d-axis current; idDem=d-axis current demand; wmech=motor mechanical velocity; kT=permanent magnet torque constant=1.5*p*FluxPM, where p-number of motor pole pairs; FluxPM=permanent magnet flux; kRel=reluctance torque constant.

FIG. 8 shows the similar model used to calculate the torque demand limits when the motor is generating, defined by the model function:

$$v_{batt}i_{batt} = R_s(i_d^2 + i_q^2) + (i_q k_T + i_q i_d k_{Rel})\omega_m$$

For generating the equation to solve becomes:

$$v_{batt}i_{min} = R_s(i_{dDem}^2 + i_q^2) + (i_{qmax}k_T + i_{qmax}i_{dDem}k_{Rel})\omega_m$$

Note: this time $i_{min}$ is negative. Note that in the case of the motor generating an additional input is provided indicative of the maximum electric power regeneration.

Figure 9:
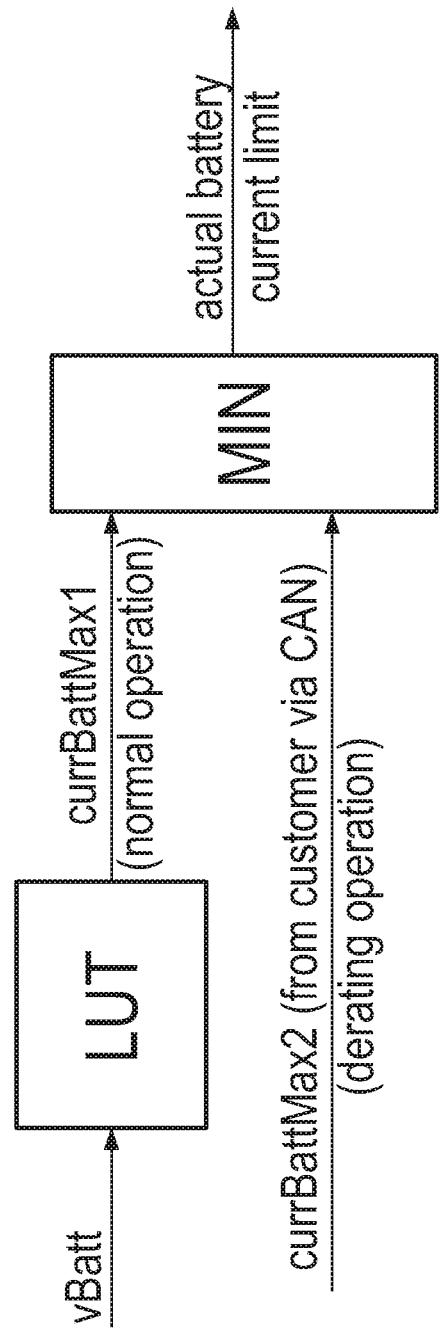
FIG. 9 is a functional block within the torque demand limiter that enables a customer to overrule the current limits.

The limits for motoring and generating and shown in FIG. 16. In addition, the current limits may in at least one embodiment of the present disclosure be overruled by a user defined current limit. This may be fed into the torque demand limiter as shown in FIG. 9. As can be seen the current limits are normally set using the lookup table LUT as a function of battery voltage Vbatt, but can be overruled by a customer set limit where the customer set limit is lower.

Function 2) Torque gradient limit: As well as setting a limit of the maximum current, it is desirable to limit the rate of change of current drawn from or fed back to the motor. The applicant has appreciated that through use of a suitable motor model this can be achieved by limiting the torque gradient.

To understand what is meant by torque gradient, FIG. 17 shows a change in battery current demand over time. Three different changes are shown, with one in solid line having an acceptable gradient and one marked with crosses not acceptable. The one in between is also acceptable provided the instantaneous gradient is within limits. FIG. 18 shows how the lines are not in reality straight lines with spikes in gradient for short durations.

The provision of the torque gradient limiter has been found by the applicant to be useful where the ability of the electrical supply to deliver high rates of change of current is compromised, as might happen if the battery is partially or fully depleted or becomes disconnected. Its function is to ensure that the rate of change of battery current drawn by the motor (the battery gradient) does not exceed a predefined threshold. This is achieved by limiting the gradient of the torque demand signal.

The gradient limiter block is shown in FIG. 13. As can be seen, this limits the gradient in series after the maximum value has been limited, although it could be done before the maximum value is limited. The gradient limiter therefore limits the rate of change of torque demand, which in turn limit the rate of change of the current that is drawn by the motor from the battery at time where the rate of change would exceed a threshold. The PI controller proportional and integral terms are chosen in such a way that the transients are neither under or over damped during times of limiting, to follow as closely as possible the ideal d-q axis current demand signal values.

Model Error reduction: In addition to limiting the maximum torque demand value and the gradient, the applicant has appreciated that there may be times when the model is insufficiently accurate for the current limit to be achieved by limiting the torque. In a perfect motor, with a perfect model, a torque limit can be set which gives a known current limit. In an imperfect motor or model, the actual current may still exceed the limit. The torque demand limit is an estimated value calculated for static conditions (constant speed and constant current limit) and there is no guarantee that if the actual torque demand is limited to this torque limit, the battery current limit is not exceeded. This is because some of the motor parameters used in this calculation chain are not known very accurately (e.g. due to stator resistance) and because during current ramp-up extra current/power is needed to bring the actual current to the target value.

Figure 10:
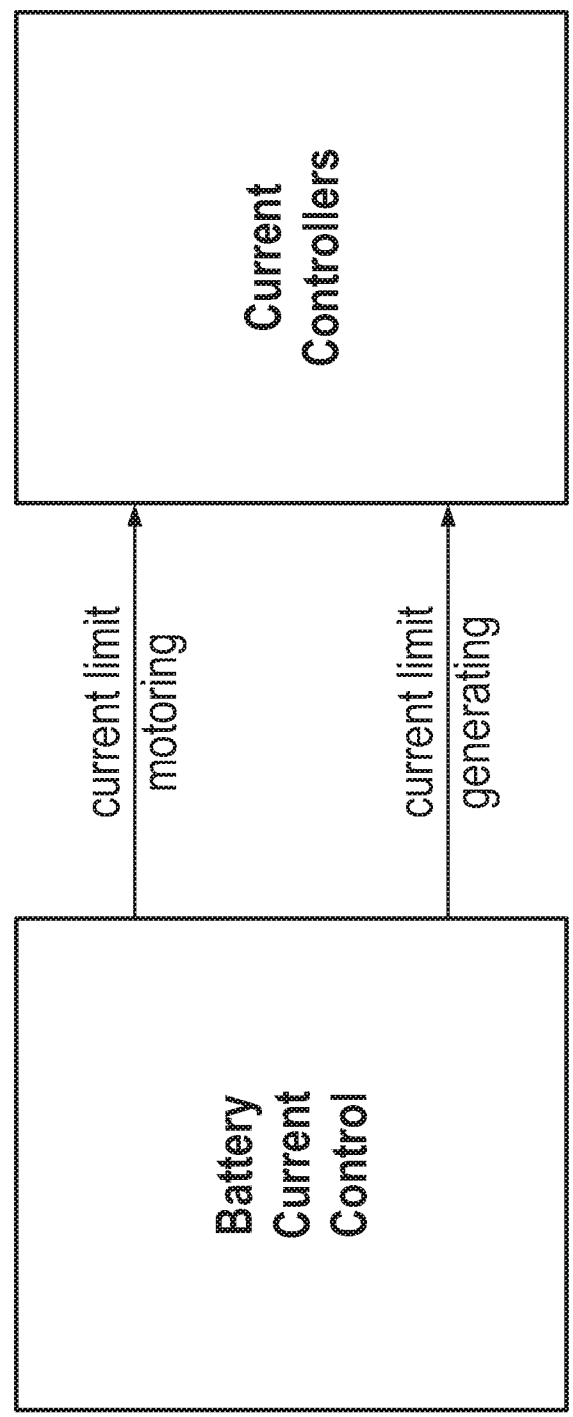
FIG. 10 shows the interface between the current controller and the motor current controller for use in correcting errors in the model of the motor.

To accommodate this model error, the apparatus may be configured to monitor the actual motor currents and in the event that these do exceed the limits set may instruct a further reduction in the torque demand limit. This is shown in FIGS. 10 and 11. The loop formed by feeding back the measured currents is also shown in FIG. 5 where the currents are input to the torque demand limit generator. The application of this error correction to the complete apparatus can also be summarised as shown in FIG. 19 of the drawings. This error correction can be omitted if the model can is sufficiently accurate.

Charge excess: Where there is a model error, and the current demand from time to time exceeds the limits, there will be a charge excess which is accumulated over time. This charge excess can be seen in FIG. 15 as the solid shaded regions. This is undesirable as it as a non-zero charge would reduce the torque/power capability of the system.

The charge is defined as the integral of positive battery current error (actual-limit) for motoring and negative battery current error (actual-limit) for generating. The charge is calculated as a moving average over a predefined window (e.g. 1 second) with an update rate of, for example, 50 times/second. This strategy ensures that at any time in the last second (as an example) the battery current limit is not exceeded by the maximum charge limit. If in the next predefined window, no increment in the charge exists, the torque limits reduction factor will be set to unity (no correction needed) as the charge becomes zero.

$$Q_{motor}[As] = \int_0^{1s}(i_{batt}-i_{limmot}) \cdot [(i_{batt}-i_{limmot})>0]$$

$$Q_{generator}[As] = \int_0^{1s}(i_{batt}-i_{limgen}) \cdot [(i_{batt}-i_{limgen})<0]$$

The apparatus may be arranged to measure this charge excess over time and to apply a charge multiplication factor to the torque demand limit as shown in FIG. 12.

What is claimed is:

1. An apparatus for controlling an electric motor, the electrical motor and the apparatus being supplied by a battery source, the apparatus comprising:
   a controller arranged to receive as an input a torque demand signal indicative of an amount of torque demanded from the motor and to produce as an output a set of motor current demand signals; and
   a drive stage which receives the set of motor current demand signals and is arranged to cause currents to flow in each phase of the motor as required to meet the amount of torque demanded;
   wherein the apparatus further comprises a torque demand limit generator which is arranged to output a torque demand limit signal indicative of a torque demand limit, wherein the torque demand signal has a value that is dependent on an amount of assistance of torque demanded from the motor and the torque demand limit signal, such that the value of the torque demand signal does not exceed a limit value.

2. The apparatus as defined in claim 1, further comprising a torque demand generator which generates the torque demand signal indicative of the amount of torque demanded from the motor.

3. The apparatus as defined in claim 2, wherein the torque demand generator generates an ideal torque demand signal independent of the torque demand limit signal, and subsequently modifies the torque demand signal if the torque demand signal would exceed the limit value to produce the torque demand signal that is fed to the controller.

4. The apparatus as defined in claim 2, wherein the torque demand limit generator sets the value of the torque demand limit signal using a model of the motor and the drive stage via a torque demand limiter.

5. The apparatus as defined in claim 3, wherein the torque demand limit generator sets the torque demand limit as a function of a voltage of the battery via a torque demand limiter.

6. The apparatus as defined in claim 4, wherein the torque demand limit generator uses one or more parameters when determining the torque limit: a motor battery current limit; a generator battery current limits; a motor electric power limit; a generator electric power limit.

7. The apparatus according to claim 3, wherein the torque demand limit generator generates one or more battery current limits, and the one or more battery current limits are fed into a model of the motor apparatus along with the battery voltage and used by the torque demand limiter to determine the torque demand limit.

8. The apparatus as defined in claim 7, wherein the torque demand generator limits a rate of change of demanded torque such that a rate of change of current drawn from a power supply during motoring or fed back into the power supply during generating is limited.

9. The apparatus as defined in claim 8, further comprising a current monitor to monitor actual current demand values from the controller or monitor motor actual currents or calculate estimates of the currents, and in response to one of the actual current demand values, the motor actual currents, or the calculated estimates of the currents exceeding the one or more battery current limits the torque demand limiter reduces the torque demand limit.

10. The apparatus as defined in claim 9, wherein the torque demand generator limits the rate of change of the torque demand.

11. A method of controlling an electric motor circuit comprising an electric motor and a control circuit, the motor and control circuit being supplied by a battery source, the control circuit including a torque demand generator which generates a torque demand signal dependent on an amount of torque demanded from the motor, and a controller arranged to receive as an input the torque demand signal and to produce as an output a set of motor current demand signals, and a drive stage which receives the set of motor current demand signals and is arranged to cause currents to flow in each phase of the motor to meet the amount of torque demanded, the method comprising generating a torque demand limit signal indicative of a torque demand limit and generating a torque demand signal that has a value that is dependent on an amount of assistance torque demanded from the motor and the torque demand limit signal, such that the value of the torque demand signal does not exceed a limit value.

12. The method as defined in claim 11, further comprising the step of generating the torque demand limit signal using a model of the motor including one or more motor parameters.

13. The method as defined in claim 12, further comprising the step of measuring a current flowing in the motor and in response to the current exceeding a current limit modifying the torque demand limit signal.

* * * * *